(12) United States Patent
Bonacini

(10) Patent No.: US 8,459,106 B2
(45) Date of Patent: Jun. 11, 2013

(54) EQUIPMENT FOR TEST STANDS OF THE BRAKING SYSTEM OF VEHICLES

(75) Inventor: Maurizio Bonacini, Correggio (IT)

(73) Assignee: Giuliano Group S.p.A., Correggio (RE) (IT)

( * ) Notice: Subject to any disclaimer, the term of this patent is extended or adjusted under 35 U.S.C. 154(b) by 0 days.

(21) Appl. No.: 13/241,671

(22) Filed: Sep. 23, 2011

(65) Prior Publication Data

US 2012/0118054 A1 May 17, 2012

(30) Foreign Application Priority Data

Nov. 17, 2010 (IT) .............................. MO2010A0330

(51) Int. Cl.
*G01L 5/28* (2006.01)

(52) U.S. Cl.
USPC ....................................................... 73/116.01

(58) Field of Classification Search
USPC ............... 73/116.01, 116.05, 116.06, 116.07, 73/116.09
See application file for complete search history.

(56) References Cited

U.S. PATENT DOCUMENTS

| | | | | |
|---|---|---|---|---|
| 3,763,699 A * | 10/1973 | Sangster | ..................... | 73/116.07 |
| 3,905,225 A * | 9/1975 | Moss et al. | ................. | 73/116.06 |
| 4,953,391 A * | 9/1990 | Schober et al. | ............ | 73/116.07 |
| 5,337,600 A * | 8/1994 | Kaneko et al. | ............. | 73/116.07 |
| 6,457,352 B1 * | 10/2002 | Knestel | ....................... | 73/117.03 |
| 6,505,503 B1 * | 1/2003 | Teresi et al. | ................ | 73/118.01 |
| 7,509,846 B2 * | 3/2009 | Matsumoto | ................ | 73/116.07 |
| 7,543,487 B2 * | 6/2009 | Matsumoto | ................ | 73/116.07 |
| 8,240,197 B2 * | 8/2012 | Lawrence et al. | .............. | 73/123 |
| 2008/0087104 A1 * | 4/2008 | Matsumoto | ................ | 73/862.55 |

FOREIGN PATENT DOCUMENTS

DE 199 23 340 12/2000
FR 1 126 530 11/1956

OTHER PUBLICATIONS

European Search Report dated Dec. 8, 2011 in European Patent Application No. 11 18 9361.
Italian Search Report dated Aug. 2, 2011 in Italian Application No. MO2010A000330 (With relevant parts in English).

* cited by examiner

*Primary Examiner* — Freddie Kirkland, III
(74) *Attorney, Agent, or Firm* — Collard & Roe, P.C.

(57) ABSTRACT

The equipment (1) for test stands of the braking system of vehicles comprises a supporting element (2) associable with a test stand (A) of the braking system of vehicles, on top of part of measuring rollers (C). The supporting element (2) has a lowered portion (3) suited to accommodate resting a first wheel (D) of a vehicle while a second wheel (E) of the vehicle is resting on the measuring rollers (C) and is substantially aligned with the first wheel (D).

14 Claims, 3 Drawing Sheets

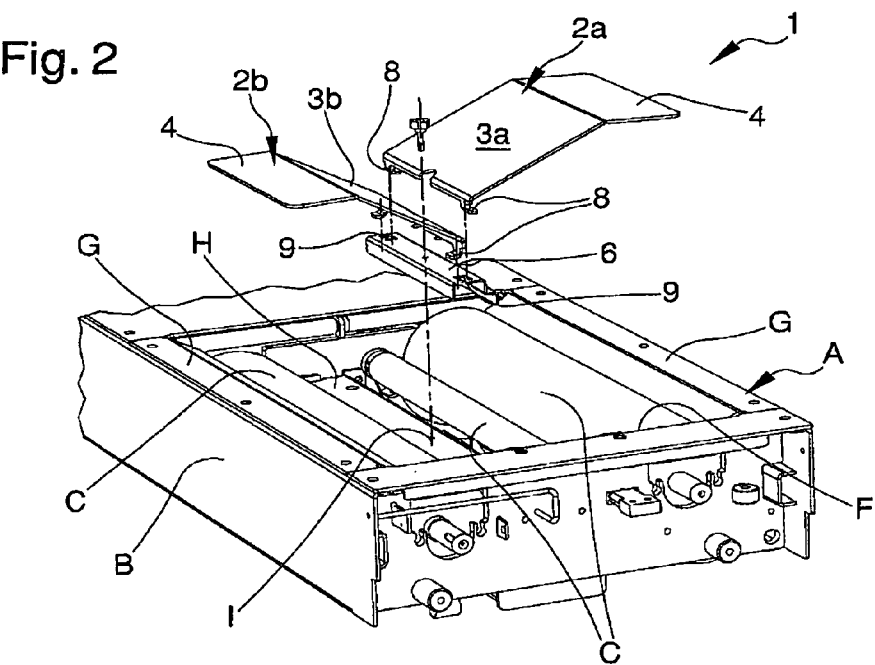
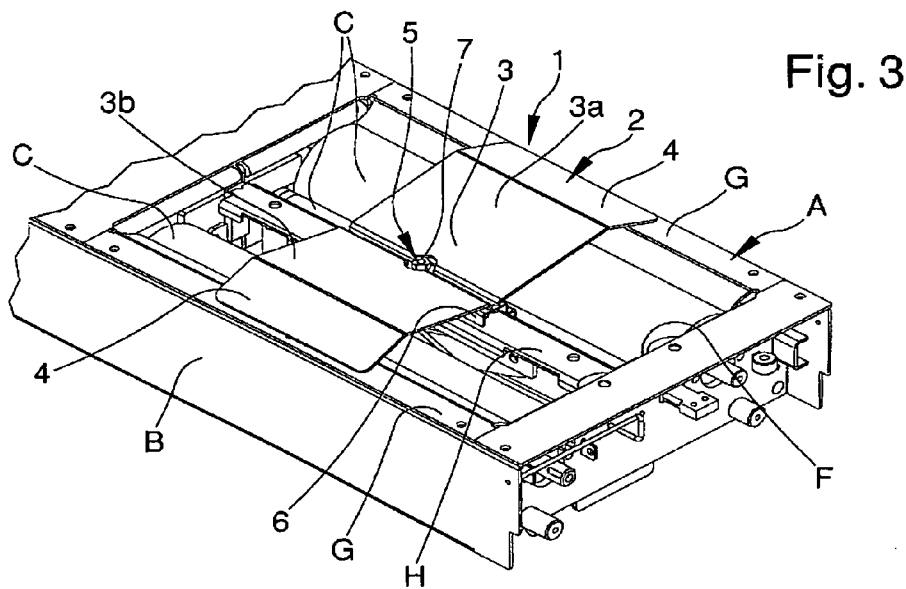

EQUIPMENT FOR TEST STANDS OF THE BRAKING SYSTEM OF VEHICLES

CROSS REFERENCE TO RELATED APPLICATIONS

Applicant claims priority under 35 U.S.C. §119 of Italian Application No. MO2010A000330 filed on Nov. 17, 2010, the disclosure of which is incorporated by reference.

BACKGROUND OF THE INVENTION

1. Field of Invention

The present invention relates to a piece of equipment for test stands of the braking system of vehicles, particularly for testing the braking system of vehicles with two wheels arranged side by side with reduced track.

The use is known inside workshops of so-called roller test stands for testing vehicle braking systems.

2. The Prior Art

Such test stands, in particular, are commonly used during the overhaul of motor vehicles, commercial vehicles, mopeds and motorcycles with three or four wheels to measure and test the braking force on each of the vehicle wheels.

The test stands of known type generally comprise a bearing structure which can be encased inside a suitable housing on a supporting surface of the vehicle to be overhauled.

On the top of the bearing structure is a pair of seats arranged alongside and distanced from one another, designed to accommodate respective vehicle wheels during the braking system test stage.

Each of the seats, in particular, is composed of a rectangular opening defined on the upper surface of the bearing structure and of a compartment for housing the rollers used to measure the braking force.

In practice, during the overhaul of a conventional three or four-wheeled vehicle, the vehicle can be placed on the platform with two of the wheels positioned inside each of the two seats respectively, resting on the measuring rollers.

The vehicle braking force tests can therefore be conducted in a totally independent way on each of the wheels, suitably piloting the rollers inside the seats and the brakes of the vehicle.

These known test stands have, however, a number of drawbacks.

The use is in fact known and widespread of particular three-wheeled motorcycles which have two steering wheels side by side on the forecarriage and a single drive wheel at the rear.

The two front wheels have a considerably reduced track (equal to about 42 cm) compared to commonly used means and this does not allow performing an accurate test using traditional test stands.

In test stands in fact, the distance between the two seats designed to accommodate the wheels of a vehicle is greater than the track of the front wheels of such motor vehicles.

To perform a test of the braking system of the motor vehicle, it is therefore necessary to alternately position each of the front wheels on the rollers inside one of the seats, while the other wheel remains resting on the top surface of the test stand.

This way however, the motor vehicle is unbalanced on the rollers and therefore the results of the test on the braking system are imprecise and not acceptable for the purposes of a correct overhaul.

SUMMARY OF THE INVENTION

The main aim of the present invention is to provide a piece of equipment for test stands of the braking system of vehicles which allows performing tests of the braking system of vehicles having two wheels arranged side by side with reduced track.

Another object of the present invention is to provide a piece of equipment for test stands of the braking system of vehicles that allows overcoming the mentioned drawbacks of the state of the art in the ambit of a simple, rational, easy and effective to use as well as low cost solution.

The above objects are achieved by the present piece of equipment for test stands of the braking system of vehicles, characterized by the fact that it comprises at least a supporting element associable with a test stand of the braking system of vehicles, on top of part of measuring rollers of said test stand, said supporting element having at least a lowered portion suited to accommodate resting a first wheel of a vehicle while a second wheel of said vehicle is resting on said measuring rollers and is substantially aligned with said first wheel.

BRIEF DESCRIPTION OF THE DRAWINGS

Other characteristics and advantages of the present invention will become more evident from the description of two preferred, but not sole, embodiments of a piece of equipment for test stands of the braking system of vehicles, illustrated purely as an example but not limited to the annexed drawings in which:

FIG. 2 is an axonometric view of a detail of the test stand of FIG. 1 with the equipment in an exploded configuration according to the invention;

FIG. 3 is an axonometric view of a detail of the test stand of FIG. 1 with the equipment according to the invention in a raised position;

DETAILED DESCRIPTION OF THE PREFERRED EMBODIMENTS

With particular reference to such figures, globally indicated by 1 is a piece of equipment for test stands of the braking system of vehicles, particularly for testing the braking system of vehicles with two wheels arranged side by side with reduced track.

Advantageously, the equipment 1 can be installed on the roller test stands commonly used to test conventional vehicles and motor vehicles so as to allow braking system testing for all those vehicles which, for example:

- have a forecarriage consisting of two steering wheels arranged side by side with reduced track and a single rear drive wheel;
- have a single front wheel and two wheels arranged side by side with reduced track on the rear;
- have two front wheels arranged side by side with reduced track and two rear wheels arranged side by side with reduced track.

By way of example only, the above illustrations show the fitting of the equipment 1 to a roller test stand A of the type commonly used for four-wheeled vehicles (or with three wheels with conventional track).

Fitting the equipment 1 to test stands of different type cannot however be ruled out.

The equipment 1 comprises a supporting element 2, substantially plate-shaped, associable with the bearing structure B of the test stand A, above part of the measuring rollers C intended to perform the vehicle braking system test.

Figure 1:
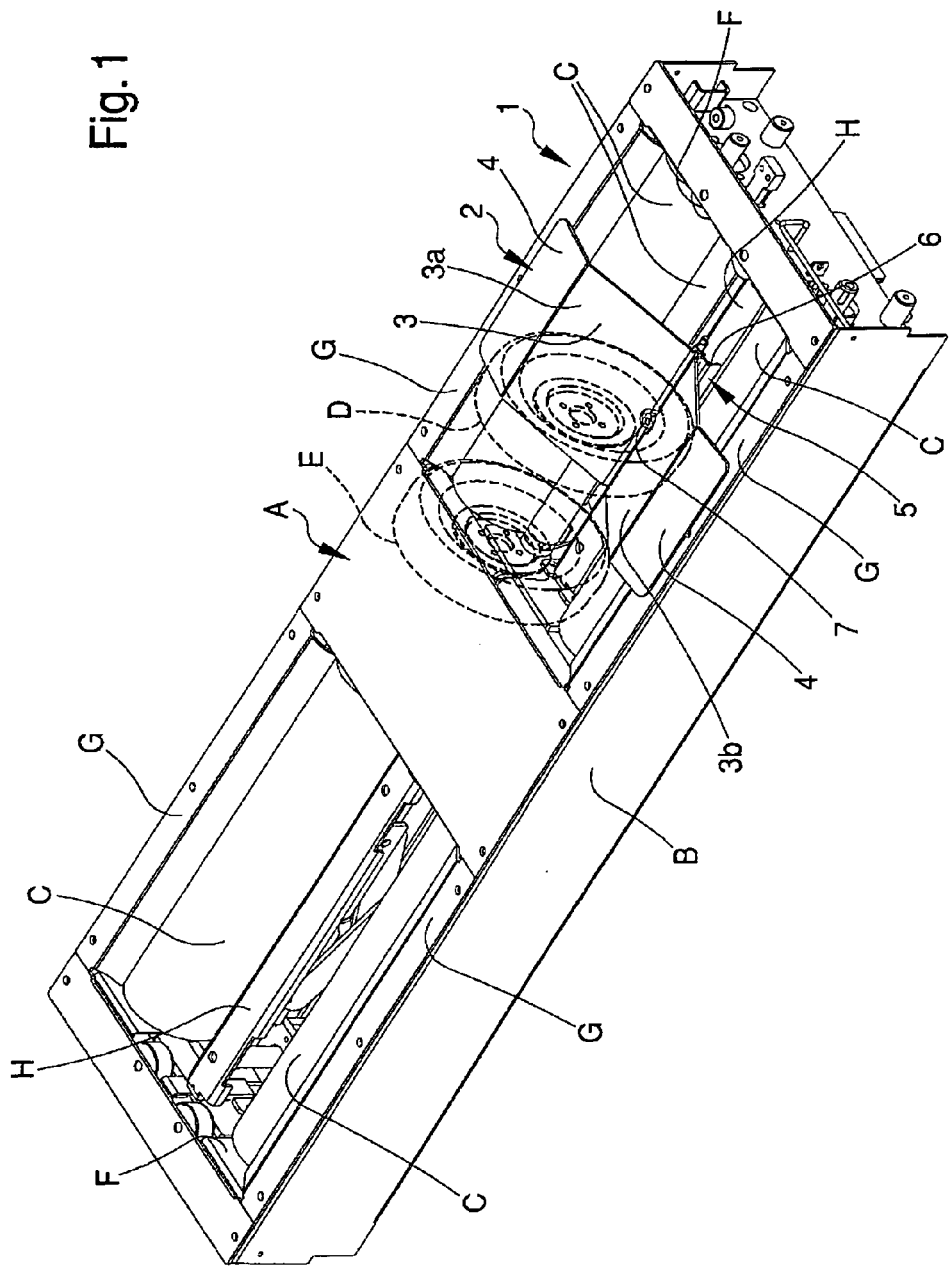
FIG. 1 is an axonometric view of a test stand for vehicles having the equipment according to a first embodiment of the invention.

With reference to the first embodiment shown in the FIGS. 1, 2 and 3, the equipment 1 comprises just one supporting element 2 positionable so as to only cover the central portion of the measuring rollers C.

Advantageously, the supporting element 2 has a lowered portion 3 suited to accommodate a first wheel D of a vehicle while a second wheel E of the same vehicle is resting on the measuring rollers C.

In particular, when the supporting element 2 is associated with the bearing structure B of the test stand A, the lowered portion 3 is arranged inside the compartment F for housing the measuring rollers C, in the proximity of the rollers themselves.

This way, the first and the second wheel D and E are aligned the one with the other, being substantially at the same height, and the brake test for the second wheel E can be correctly performed, obtaining reliable results.

Usefully, the supporting element 2 has a substantially elongated shape and, at the extremities, has two resting portions 4 positionable in correspondence to the opposite sections of the edge G of the compartment F.

With special reference to the embodiment of the equipment 1 shown in the illustrations, the lowered portion 3 is composed of two sloped sections 3a and 3b extending from the resting portions 4 towards a substantially intermediate section of the supporting element 2 and towards the inside of the compartment F.

A different shape of the lowered portion 3 cannot however be ruled out. Usefully, the equipment 1 comprises fixing means 5 of the supporting element 2 to the test stand A.

With particular but not sole reference to the embodiment of the equipment 1 shown in the FIGS. 1, 2 and 3, the test stand A has a lift that is suited to accommodate the wheel of a vehicle, positioning it on the measuring rollers C and lifting it at the end of the braking system test.

The fixing means 5 comprise an anchoring element 6 associable with a support H arranged inside the compartment F and made up of a portion of the lift designed to accommodate the wheel by resting.

Different embodiments of the equipment 1 cannot however be ruled out installable on test stands without a lift, wherein the supporting element 2 is fastened to different elements or parts of the test stand itself.

In the solution shown in the FIGS. 1, 2 and 3, in particular, the support H is mobile between a raised position, shown in FIG. 3, wherein it is arranged in the proximity of the upper portion of the measuring rollers C, substantially at the height of the edge G of the compartment F, and a lowered position, shown in the FIGS. 1 and 2, wherein it is arranged on the bottom of the compartment F, underneath with respect to the upper portion of the measuring rollers C.

The anchoring element 6 is positionable on the support H and has an elongated shape substantially reproducing the profile of the support itself.

The fixing means 5 also comprise a locking element 7 for locking the anchoring element 6 on the support H, made up of a screw or the like engageable inside a corresponding hole I on the support H by means of a hole passing through the anchoring element 6.

Usefully, the supporting element 2 is made up of two separate plates 2a and 2b associable with the anchoring element 6.

In particular, the plates 2a and 2b have respective resting portions 4 and respective sloped sections 3a and 3b.

The part of each of the sloped sections 3a and 3b opposite the resting portion 4 can be associated in a removable way with the anchoring element 6 by means of suitable fastening means and, this way, the two sloped sections 3a and 3b are brought close together to define the lowered portion 3.

The above fastening means are made up, in particular, of a pair of hooks 8 protruding from each of the plates 2a and 2b, engageable inside a pair of slots 9 obtained on the anchoring element 6.

During use, the equipment 1 is positioned in correspondence to one of the compartments F of the test stand A.

In particular, the anchoring element 6 is fastened to the support H by means of the screw 7 and the plates 2a and 2b are arranged with the hooks 8 inside the slots 9 and with the resting portions 4 on opposite sections of the edge G of the compartment F.

Initially, the support H of the lift is in raised position, with the supporting element 2 that substantially defines a horizontal resting surface (FIG. 3).

The vehicle is positioned so as to arrange the first wheel D on the supporting element 2 and the second wheel E on the support H.

Subsequently, the support H is moved to the lowered position until the second wheel E is positioned on the measuring rollers C.

In this position, the first wheel D is inside the lowered portion 3 of the supporting element 2 and is arranged aligned and substantially at the same height with respect to the second wheel E.

At this point, the test can be performed of the vehicle braking system on the second wheel E by means of the measuring rollers C of the test stand A.

At the end of this test, the support H of the lift is returned to raised position and, in the same way as described above, the second wheel E can be positioned on the supporting element 3, to perform the test on the braking system of the first wheel D.

Figure 4:
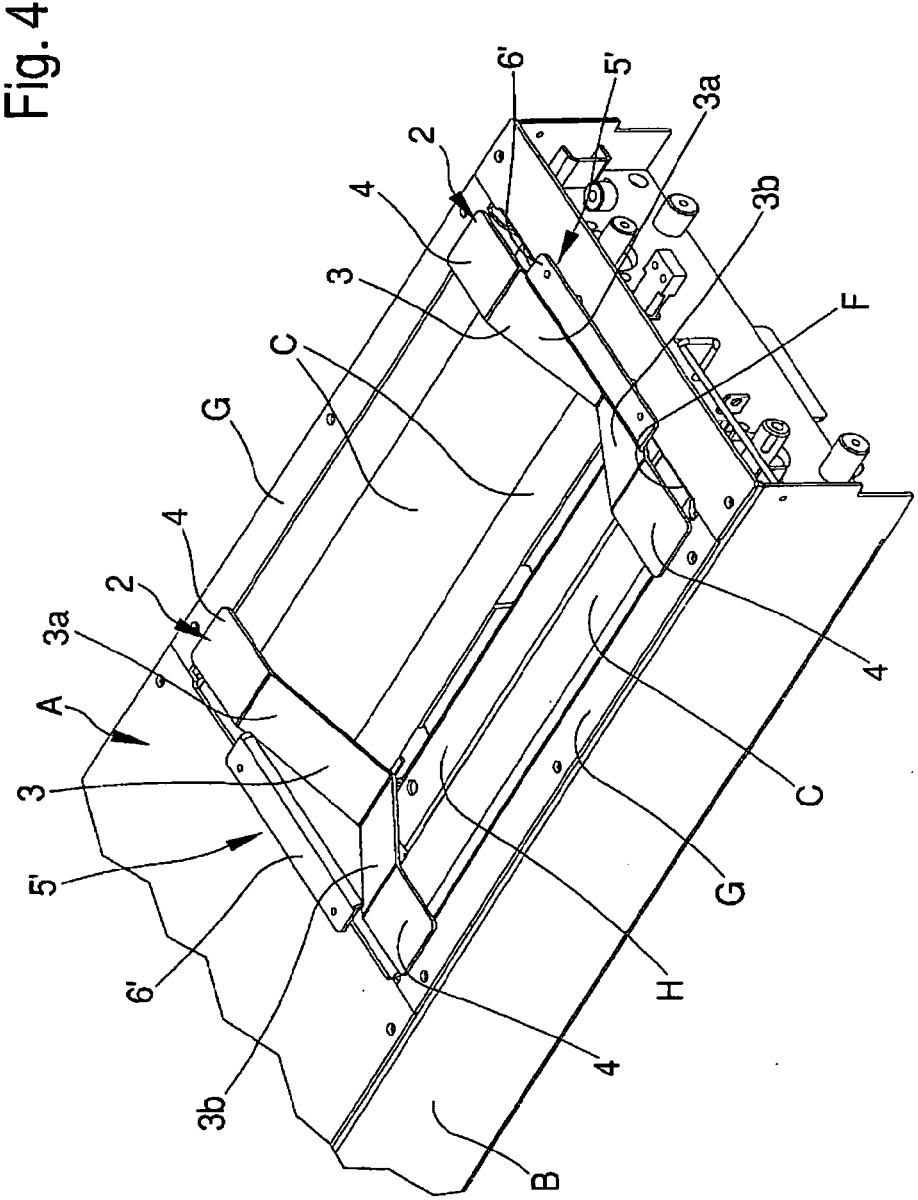
FIG. 4 is an axonometric view which shows a second embodiment of the equipment according to the invention fitted to a test stand for vehicles.

With reference to the second embodiment of the invention, shown in FIG. 4, the equipment 1 has two supporting elements 2 positionable so as to cover the extremal portions of the measuring rollers C respectively, leaving their central portion uncovered.

In particular, each of the supporting elements 2 has a lowered portion 3 suited to accommodate a first wheel of a vehicle while a second wheel of the same vehicle is resting on the measuring rollers C.

Usefully, each of the supporting elements 2 has a substantially elongated shape and has two resting portions 4 at its extremities positionable in correspondence to opposite sections of the edge G of the compartment F.

Each of the lowered portions 3 is made up of two sloped sections 3a and 3b which extend from the resting portions 4 towards a substantially intermediate section of the supporting element 2 and towards the inside of the compartment F.

Different shapes of the lowered portions 3 cannot however be ruled out.

Usefully, the equipment 1 comprises fixing means 5' of each of the supporting elements 2 to the test stand A.

For each of the supporting elements 2, in particular, the fixing means 5' comprise an anchoring element 6', made up of a bracket that can be fastened by means of threaded means along a side section of the edge G of the compartment F.

The presence, furthermore, cannot be ruled out of fixing means of each of the supporting elements 2 to the support H of a lift of the test stand A, having an anchoring element the same as the anchoring element 6 described above for the first embodiment of the equipment 1.

In this case, similarly to what has been seen above for the first embodiment of the equipment 1, each of the supporting elements 2 can be composed of two separate plates associable with the anchoring element 6.

During use, the vehicle is positioned so as to arrange the first wheel D on one of the supporting elements 2 and the second wheel E on the substantially central portion of the rollers C.

In this position, the first wheel D is inside the lowered portion 3 of the supporting element 2 and is arranged aligned and substantially at the same height with respect to the second wheel E.

At this point, the test can be performed of the braking system of the vehicle on the second wheel E by means of the measuring rollers C of the test stand A.

At the end of such test, the second wheel E can be positioned on the other of the supporting elements 3, to perform the test on the braking system of the first wheel D.

It has been ascertained how the described invention achieves the proposed objects.

The invention claimed is:

1. Equipment (1) for test stands of a braking system of vehicles, comprising at least a supporting element (2) associable with a test stand (A) of the braking system of vehicles, on top of part of measuring rollers (C) of said test stand (A), said supporting element (2) having:
   at least a resting portion (4) positionable on a bearing structure (B) of the test stand (A) and
   at least a lowered portion (3) arranged inside a compartment (F) for housing said measuring rollers (C) and in proximity of said measuring rollers, when said resting portion is positioned on said bearing structure (B) and suited to accommodate resting a first wheel (D) of a vehicle while a second wheel (E) of said vehicle is resting on said measuring rollers (C) and is substantially aligned with said first wheel (D).

2. Equipment (1) according to the claim 1, wherein said supporting element (2) comprises at least two resting portions (4) to said bearing structure (B) of the test stand (A), said resting portions (4) being positionable in correspondence to substantially opposite sections of an edge (G) of said compartment (F) for housing said measuring rollers (C).

3. Equipment according to the claim 2, wherein said supporting element (2) has a substantially elongated shape and has said resting portions (4) at its extremities.

4. Equipment according to claim 3, wherein said lowered portion (3) comprises at least two sloped sections (3a, 3b) which extend from said resting portions (4) towards a substantially intermediate section of said supporting element (2).

5. Equipment (1) according to claim 1, wherein said lowered portion (3) comprises at least a sloped section (3a, 3b).

6. Equipment (1) according to claim 1, wherein said supporting element (2) is substantially plate-shaped.

7. Equipment according to claim 1, comprising fixing means (5, 5') of said supporting element (2) to said test stand (A).

8. Equipment according to claim 7, wherein when said supporting element (2) is associated with said test stand (A), said lowered portion (3) is arranged inside a compartment (F) for housing said measuring rollers (C) and in proximity of said measuring rollers (C), and said fixing means (5) comprise at least an anchoring element (6) associable with said supporting element (2) and associable with at least a support (H) inside said compartment (F) of the test stand (A), said support (H) being mobile between a raised position and a lowered position with respect to said measuring rollers (C).

9. Equipment (1) according to claim 8, wherein said fixing means (5) comprise at least a locking element (7) for locking said anchoring element (6) to said support (H).

10. Equipment (1) according to claim 8, wherein said supporting element (2) comprises at least two separate plates (2a, 2b) associable with said anchoring element (6).

11. Equipment (1) according to claim 10, wherein said plates (2a, 2b) comprise respective resting portions (4) to said bearing structure (B) of the test stand (A) and respective sloped sections (3a, 3b), said resting portions (4) being positionable in correspondence to substantially opposite sections of the edge (G) of said compartment (F) for housing the measuring rollers (C) and said sloped sections (3a, 3b) being positionable close together and associable with said anchoring element (6) to define said lowered portion (3).

12. Equipment (1) according to claim 10, comprising fastening means (8, 9) of each of said plates (2a, 2b) to said anchoring element (6).

13. Equipment (1) according to claim 12, wherein said fastening means (8, 9) comprise at least a hook (8) protruding from each of said plates (2a, 2b) and is engageable inside at least a respective slot (9) on said anchoring element (6).

14. Equipment (1) according to claim 7, wherein when said supporting element (2) is associated with said test stand (A), said lowered portion (3) is arranged inside a compartment (F) for housing said measuring rollers (C) and in proximity of said measuring rollers (C), and said fixing means (5') comprise at least an anchoring element (6') associable with said supporting element (2) and associable with the edge (G) of said compartment (F).

\* \* \* \* \*